United States Patent [19]

Schulz et al.

[11] Patent Number: 4,832,866
[45] Date of Patent: May 23, 1989

[54] PROCESS FOR THE PRODUCTION OF FREE-FLOWING, STABLE FOAM INHIBITOR CONCENTRATES BY COMPACTING GRANULATION

[75] Inventors: Paul Schulz, Wuppertal; Juergen Waldmann, Monheim; Franz-Josef Carduck, Haan; Martin Witthaus, Duesseldorf; Edmund Schmadel, Leichlingen, all of Fed. Rep. of Germany

[73] Assignee: Henkel Kommanditgesellschaft auf Aktien, Duesseldorf, Fed. Rep. of Germany

[21] Appl. No.: 103,790

[22] Filed: Oct. 1, 1987

[30] Foreign Application Priority Data

Oct. 2, 1986 [DE] Fed. Rep. of Germany ....... 3633519

[51] Int. Cl.$^4$ ............................................. B01D 19/04
[52] U.S. Cl. .............................. 252/321; 252/174.15; 252/358; 264/118; 264/140
[58] Field of Search ........... 252/358, 321, 135, 174.15; 264/118, 140

[56] References Cited

U.S. PATENT DOCUMENTS 4,264,465  4/1981  Abel ..................................... 252/358
4,421,666  12/1983  Hempel et al. ..................... 252/140
4,590,237  5/1986  Wuhrmann et al. ................. 252/99

*Primary Examiner*—Paul Lieberman
*Assistant Examiner*—Christine A. Skane
*Attorney, Agent, or Firm*—Ernest G. Szoke; Wayne C. Jaeschke; Real J. Grandmaison

[57] ABSTRACT

Free-flowing, particulate foam inhibitor concentrates, which suffer no loss of activity in admixture with surfactants or strong alkalis, are prepared by compacting a mixture of from 1 to 20% by weight of the foam inhibitor with 80 to 99% by weight of a water-soluble salt or salt mixture optionally containing blending aids and having a pH value in the form of a 1% aqueous solution of from 6 to 9.5 under elevated pressure and subsequently size-reducing the compactate to an average particle size of from 0.1 to 2 mm. The presssure applied to the mixture should not significantly exceed the pressure limit at which no further compaction occurs. In addition, the particle porosity, as measured by mercury porosimetry, should be below 10%. The foam inhibitors used are preferably paraffin hydrocarbons, organopolysiloxanes and mixtures thereof with finely-divided hydrophobic solids, particularly finely-divided silica.

19 Claims, No Drawings

PROCESS FOR THE PRODUCTION OF FREE-FLOWING, STABLE FOAM INHIBITOR CONCENTRATES BY COMPACTING GRANULATION

BACKGROUND OF THE INVENTION

1. Field of the Invention

This invention relates to a process for the production of a free-flowing, storage-stable foam inhibitor concentrate obtained by compacting under elevated pressure a mixture of a foam inhibitor, finely-divided, hydrophobic solid components, and a water-soluble salt, and then size-reducing the compactate.

2. Discussion of Related Art

Foam inhibitors of the organopolysiloxane type, the paraffin hydrocarbon type, and mixtures thereof with microfine, preferably hydrophobicized or silanized silica are frequently used in surfactant-containing or strongly alkaline detergents. However, the direct contact between the foam inhibitors and the surface-active compounds or washing alkalis in such detergents often leads to a considerable loss of activity thereof during storage. Accordingly, it has been proposed to adsorb the foam inhibitors onto porous carrier materials or to embed them in water-soluble carriers and to coat them with water-soluble coating materials in order to prevent any deleterious interaction with the detergent constituents. Unfortunately, the processes involved, which generally comprise several steps, are relatively complicated and the end products frequently show a reduced dissolving rate in water with the result that release of the foam inhibitor is delayed so that, initially, the foam in the solution is not sufficiently inhibited.

Therefore, it is an object of this invention to avoid and/or overcome the afore-noted disadvantages of the prior art.

DESCRIPTION OF THE INVENTION

Other than in the operating examples, or where otherwise indicated, all numbers expressing quantities of ingredients or reaction conditions used herein are to be understood as modified in all instances by the term "about".

This invention relates to a process for the production of a free-flowing foam inhibitor concentrate comprising (1) preparing an intimate mixture (on an anhydrous basis) comprising (a) from about 1 to about 20% by weight of at least one foam inhibitor selected from the group consisting of a paraffin hydrocarbon, an organopolysiloxane, and a mixture thereof with a finely-divided, hydrophobic solid component such as silanized silica, and (b) from about 80 to about 99% by weight of a water-soluble salt or of a mixture consisting primarily of such salts, including a suitable blending aid, and having a pH in the form of a 1% aqueous solution thereof of from about 6 to about 9.5, (2) compacting said mixture under elevated pressure without significantly exceeding the pressure limit at which no further compaction of said mixture occurs, to provide a compactate having a total particle porosity as measured by mercury porosimetry of below about 10% and preferably below about 7%, and (3) size-reducing said compactate to a granulate having an average particle size of from about 0.1 to about 2 mm.

Suitable foam inhibitors (component a) include paraffins and paraffin mixtures, for example liquid paraffins, soft paraffins, hard paraffins and microcrystalline waxes, and mixtures thereof with a hydrophobic, finely-divided solid component such as a hydrophobicized or silanized silica; and organopolysiloxanes, as described, for example, German patent application Nos. 25 00 411, 26 50 365, and 28 57 155, and in European patent applications Nos. 150 386 and 63 346. Other suitable foam inhibitors include organosiloxanes and their various modification products; polysiloxane resins and, in particular, mixtures thereof with microfine, pyrogenic or precipitated silica which may be hydrophobicized or silanized; and mixtures of polysiloxanes, polysiloxane resins and the aforementioned silicas. Examples of such foam inhibitors are disclosed in U.S. Pat. No. 3,933,672 and in German patent application No. 34 27 496.

The foam inhibitor is introduced into the mixture in a quantity of from about 1 to about 20% by weight, and preferably, in a quantity of from about 2 to about 10% by weight, based on the weight of the mixture.

Suitable water-soluble salts (component b) include those which have a pH value in the form of a 1% aqueous solution of from about 6 to about 9 and which preferably are not hygroscopic, particularly sulfates, chlorides, phosphates and acetates of sodium and/or potassium, such as anhydrous sodium sulfate or sodium sulfate containing water of crystallization and mixtures thereof, sodium chloride, potassium sulfate, potassium chloride, sodium acetate, monosodium and disodium orthophosphate, monopotassium and dipotassium orthophosphate, sodium acetate, potassium acetate and mixtures of these salts. Anhydrous sodium sulfate has proven to be particularly suitable herein. The salts which are introduced into the mixture preferably have a particle size of from about 0.01 to about 2 mm, and more preferably of from about 0.1 to about 0.5 mm.

The foam inhibitors are usually liquid or paste-like and may be introduced into the mixture in that form. Where they are present in solid, for example block form, or in powder or granular form, they may either be fused and applied through suitable one-component or two-component nozzles to the, for example, mechanically uncirculated or unmixed cold carrier material or, in the case of active-substance powders (for example foam inhibitor prills), may be mixed cold in solid form, their particle size preferably being from about 0.001 to about 0.2 mm, and more preferably from about 0.01 to about 0.1 mm. In an equally preferred process, the substrate mixture is preheated, thoroughly mixed with the active-substance melt at about 40° to about 150° C. and further processed with or without intermediate cooling. Standard mixers are suitable for the preparation and homogenization of the mixture. Mixing may even be carried out in the compacting machine, for example a screw extruder, into which the streams of material are continuously introduced.

Small quantities of water may also be added during the mixing process to improve plasticizability of the mixture. The quantity of water added may be up to about 15% by weight, but is preferably from about 5 to 10% by weight, based on the weight of the mixture.

In addition, solid additives, such as disperse silicas, zeolite and/or layer silicate powder, and conventional disintegrating agents which can regulate the dissolving behavior of the granulate and influence other product features, such as abrasion resistance, may be added to the mixture.

Further, known plasticizers, swelling agents or binders may also be added to the mixture. Suitable additives of this type, include, for example, water-soluble polymers such as cellulose or starch ethers, polyglycol ethers and homopolymeric or copolymeric vinylcarboxylic acids and salts thereof which contain acrylic acid, methacrylic acid and/or maleic acid, for example, as basic elements. In addition, substances such as starch, gelatin, gum arabic, soap and suitable surfactant components may be incorporated in the mixture to be compacted for the purpose of optimal distribution of the foam-regulating agent in the mixture, pore-free compaction in the compaction process, and high mechanical stability (hardness, abrasion resistance) of the granules. Such additives may be present in a quantity of up to about 25% by weight, but are preferably present in a maximum quantity of about 15% by weight of the mixture. Dyes or pigments may also be added to the mixture.

Suitable compacting machines include, for example, roll stands, screw extruders and pelletizers. When roll stands are used, the mixture to be compacted is passed under compression through the gap between a pair of smooth or profiled rolls rotating in opposite directions at substantially the same peripheral speed and, in the process, is compacted into a sheet-form compactate. This sheet-form compactate, which is known in Germany as a "Schuelpenband", is then subjected to a size-reduction process to form a granulated material having the desired particle size and particle size distribution. The size-reduction of the compacted sheet may be performed in a mill such as a ball mill. The size-reduced material is then preferably subjected to a size-grading process. In this process, overly coarse material is separated off and returned to the size-reducing machine, while overly fine material is returned to the batch of powder mixture and re-subjected to compaction in the roll gap.

Compaction of the mixture on correspondingly constructed paired rolls may also result in non-continuous compactates, for example briquettes, as opposed to continuous sheet-form compactates.

the roll compaction of the mixture may generally be effected with or without precompaction of the mixture. The pair of rolls may be arranged in any spatial direction, i.e. in particular, vertically or horizontally with respect to one another. The mixture is then delivered to the roll gap either by gravity filling or by means of a suitable machine, for example by means of a tamping screw.

The pressure applied in the roll gap and the residence time of the mixture under that pressure are preferably adjusted to such levels that a well developed, hard sheet-form compactate having a high density is obtained. A high degree of compression is desired in order to adjust the required powder density of the free-flowing product ultimately obtained which should be above 600 g/l and preferably above 900 g/l. The abrasion stability of the granulate is also influenced by the degree of compaction wherein high degrees of compaction provide abrasion-resistant granulates which are desirable. At the same time, however, it is important to bear in mind that excessive compression of the mixture jeopardizes the benefits of the process because, if it is applied, the mixture is plasticized on the rools and causes sticking. This unwanted effect occurs whenever an increase in compression produces no further compaction of the mixture and the additionally applied pressure results primarily in heating and plasticization of the mixture, for example through the partial melting of its constituents.

The particular optimal pressure applied depends on the formulation of the mixture. According to the invention, a specific pressure of from about 15 to 30 kN/cm roll length is normally applied in the roll gap, a specific pressure of from about 20 to 25 kN/cm roll length being particularly preferred.

Another important feature of the foam inhibitor granulates produced by compacting granulation is their total porosity as measured by mercury porosimetry. This value is a direct measure of the degree of compaction of the mixture and should be below 10% and preferably below 7.5%.

The solids density adjusted in the compactate under these specific pressures is at least about 1.7 g/cm$^3$. Corresponding solids densities of from at least about 1.8 to more than about 2g/cm$^3$ are particularly suitable. Again, the particular optimal density value to be adjusted and the particle porosity depend on the formulation of the mixture. Solids densities of from about 2 to about 2.5 g/cm$^3$ for a total porosity of from about 6 to about 7% are typical.

In addition to the application of optimal pressures in the roll gap, control of the thickness of the sheet-form compactate is of importance for achieving the desired powder densities of the free-flowing granulates. If the thickness selected for the compactate is distinctly smaller than the desired upper particle size limit of the granulated product to be produced, size-reduction of the sheet-form compactate initially obtained will produce tablet-like particles leading to fillings having a high empty-space volume and, hence, a comparatively low powder density. By contrast, with relatively thick compactates, subsequent size reduction produces particles wherein the dimensions can approximate to the basically desired value of 1:1:1. A granulometry such as this leads to relatively dense fillings having a maximum empty-space volume of about 50%. Although this value is still relatively high compared with fillings of spherical particles (where the corresponding values are normally about 35 to 45%), a slightly higher empty-space volume can also afford advantages in the context of the present invention insofar as it clearly promotes the dispensing process in the sense of an unimpeded flow of water through the filling.

In general, the abrasion resistance of the sieve-graded granulate particles is distinctly dependent upon the basic thickness of the sheet-form compactate. It is preferred that the thickness of the sheet-form compactate not be too great because experience has shown that mechanical stability and hardness are reduced in that case. The thickness of the sheet-form compactate is preferably between about 0.5 and 5 times, and most preferably, between about 1 and 2 times the upper particle size limit.

Pelletizing rolls may also be very successfully used following the addition of suitable additives to the compactate, in which case the working conditions mentioned above may generally be observed. However, this process requires adaptation of the mixture to the formulation containing plasticizing and lubricating additives.

Compaction may also be carried out in screw extruders fitted with a breaker plate of suitable size after the addition of suitable additives. In this case also, the quantity fed in should be coordinated with the feed rate and the degree of compaction so that the pressure limit at which no further compaction occurs is not significantly exceeded. This pressure limit may be determined, for example, from the evolution of heat in the extruder. An excessive pressure leads to increased heat generation and plasticization which should be avoided. The extrudate obtained is size-reduced to the particle size indicated using suitable grinding or granulating machines.

In one particular embodiment of the invention, the granulate obtained after size-reduction in the process according to the invention may also be subjected to further processing. In this regard, the granulate initially obtained is subjected to surface abrasion of its corners and edges so that, in particular, the powder density of the granulated material is further increased and its empty-space volume is correspondingly reduced. For the purposes of such an after-treatment, it is possible for example to roll the granulate initially obtained on rotating discs wherein an upper surface thereof has a toothed structure. If necessary, any undesirable fines may again be separated and returned to the roll gap for compaction.

The upper particle size limit desired for the final free-flowing granulate is from about 1.6 to 2 mm whereas, on the other hand, fines smaller than about 0.2 mm are undesirable. Accordingly, preferred free-flowing granulates have a broad particle size range of from about 0.2 to 1.6 mm.

Surprisingly, the dispensability of the granulates and the release of the foam inhibitors is promoted and not in the least impaired by the relatively high compression levels employed and, hence, by relatively high solids densities. Obviously, fillings of relatively hard particles tend to clump less and also to form less fines during the dispensing process which consequently promotes the unimpeded flow of water through the filling.

Accordingly, the practice of the present invention leads to the following surprising results. By the use of neutral or only mildly alkaline, crystalline water-soluble salts as a carrier material and by the process of blending and compacting, it is possible to obtain foam inhibitor concentrates which show no loss of activity with regard to the foam-inhibiting agent. In addition, the process leads to very high stability of the concentrate in the detergent which may possibly be based on the capillary fixing of the active substance in the compactate particle. Similar, but in terms of the process involved, more expensive stabilization is obtained by coating. The compacting process, which leads to a uniform, fine distribution of the foam inhibitor in a substantially non-porous, mechanically stable, inert solid agglomerate, represents a special case of matrix entanglement of the active substances.

EXAMPLE 1

A mixture of 1 kg of silicone foam inhibitor and 19 kg of crystalline anhydrous sodium sulfate which had been prepared in a mixer fitted with ploughshare-like mixing elements (LOEDIGE mixer), was compacted under a roll pressure of 100 bar. After cooling, the 2 mm compactate obtained was ground in a friction shredder (1.5 mm holes) and screened on a vibrating sieve (Allgaier sieve) to a particle size of from 0.2 to 1.25 mm. The granulate (yield approx. 70%) had a powder density of 1.18 g/cm$^3$, an apparent particle density of 2.34 g/cm$^3$ and a total pore volume of 6.6%. It showed no loss of activity after storage for 8 weeks in a detergent composition containing a particularly foam-intensive surfactant combination in an atmosphere cell (30° C./80% air humidity).

EXAMPLE II

A mixture of 5% of silicone foam inhibitor, 10% of polyglycol ether wax (Polywachs 2000 ®) and 85% of crystalline anhydrous sodium sulfate (high density sulfate) was extruded at 50° C. through a 2 mm breaker plate. After cooling, the extrudate was ground (1.6 mm sieve granulator) and sieve-graded (0.2 to 1.25 mm) and produced approximately 70% granulate which showed foam curves corresponding to the pure substance in washing tests.

EXAMPLE III

A mixture of 5% of silicone foam inhibitor, 7% of water, 3% of carboxymethyl cellulose and 85% of high density sulfate was pelletized through a 4.8 × 32 mm cavity block (CPM pelletizing press). Cooling produced structures having good mechanical hardness which, after grinding (hammer cage mill with 4 mm insert) and sieving (0.2 to 1.25 mm), resulted in a product having the same foam-inhibiting capacity as the pure substance. Stability in storage under the conditions described in Example I was adequate, while the non-compacted mixture was substantially deactivated after about 4 weeks in the storage test.

EXAMPLE IV

After roll compaction (Alexander roll) and cooling, a mixture of sodium sulfate and 5% of a paraffin foam inhibitor melt, which had been prepared in a mixer (LOEDIGE mixer) at 95° C., produced mechanically stable 2 mm compactates which, after grinding (sieve granulator, 1.6 mm insert) and sieving (0.2 to 1.25 mm), produced approximately 60% of granulate having a good foam-inhibiting capacity and stability in storage.

EXAMPLE V

A cold mixture of 5% of paraffin foam inhibitor prills (grain size approx. 0.1 to 0.8 mm), 12.5% of polyglycol ether wax (Polywachs 2000 ®) and 82.5% of high density sulfate was extruded through a 2 mm breaker plate at 50° C., cooled, ground (1.6 mm sieve granulator) and sieve-graded (0.2 to 1.25 mm). The inhibitor concentrate obtained showed foam-inhibiting properties corresponding to the pure substance. The foam-inhibiting capacity remained substantially intact in the atmosphere storage test.

We claim:

1. A process for the production of a free-flowing foam inhibitor concentrate comprising
   (1) preparing an intimate mixture comprising:
   (a) from about 1 to about 20% by weight of at least one foam inhibitor selected from the group consisting of a paraffin hydrocarbon, an organopolysiloxane, and a mixture thereof with a finely-divided, hydrophobic solid component, and
   (b) from about 80 to about 99% by weight of a water-soluble salt having a pH in the form of a 1% aqueous solution of from about 6 to about 9.5,
   (2) compacting said mixture under pressure without significantly exceeding the pressure limit at which no further compaction of said mixture occurs to provide a compactate having a total particle porosity as measured by mercury porosimetry of below about 10%, said compacting being performed in the roll gap of a roll stand at a specific pressure of from about 15 to about 30 kN/cm roll length applied in said roll gap, and (3) size-reducing said compactate to a granulate having an average particle size of from about 0.1 to about 2 mm.

2. A process as in claim 1 wherein said hydrophobic solid component comprises silanized silica.

3. A process as in claim 1 wherein said intimate mixture contains a blending aid.

4. A process as in claim 1 wherein said compactate has a total particle porosity as measured by mercury porosimetry of below about 7%.

5. A process as in claim 1 wherein said water-soluble salt comprises sodium sulfate.

6. A process as in claim 1 wherein said paraffin hydrocarbon is selected from the group consisting of a liquid paraffin, a soft paraffin, a hard paraffin and microcrystalline wax, and a mixture thereof.

7. A process as in claim 1 wherein said foam inhibitor is hydrophobicized or silanized.

8. A process as in claim 1 wherein said water-soluble salt is selected from the group consisting of a sulfate, chloride, phosphate and acetate of sodium and/or potassium.

9. A process as in claim 1 wherein said mixture is preheated to a temperature of from about 40 to about 150° C.

10. A process as in claim 1 wherein said mixture contains up to about 15% by weight of water, based on the weight of said mixture.

11. A process as in claim 1 wherein said mixture contains up to about 25% by weight of an additive selected from the group consisting of a plasticizer, a swelling agent, and a binder, based on the weight of said mixture.

12. A process as in claim 1 wherein said compacting step is performed in a screw extruder.

13. A process as in claim 1 wherein said compacting step is performed in a pelletizer.

14. A process as in claim 1 wherein said size-reducing step is performed in a mill to provide a size-reduced granulate of said concentrate.

15. A process as in claim 14 including size-grading said granulate.

16. A process as in claim 15 including returning over-sized particles of said granulate to said size-reducing step.

17. A process as in claim 15 including returning under-sized particles of said granulate to said compacting step.

18. A process as in claim 1 wherein said compacting step is performed under conditions to provide a granulated compactate having a density of above about 900 g/l.

19. A process as in claim 1 including subjecting said granulate to a surface abrasion process whereby its density is increased and its empty-space volume is decreased.

* * * * *